(12) United States Patent
Ikonin

(10) Patent No.: US 10,992,963 B2
(45) Date of Patent: Apr. 27, 2021

(54) INTRA SHARPENING AND/OR DE-RINGING FILTER FOR VIDEO CODING

(71) Applicant: Huawei Technologies Co., Ltd., Shenzhen (CN)

(72) Inventor: Sergey Yurievich Ikonin, Moscow (RU)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/442,656

(22) Filed: Jun. 17, 2019

(65) Prior Publication Data
US 2019/0306532 A1    Oct. 3, 2019

Related U.S. Application Data

(63) Continuation of application No. PCT/RU2016/000887, filed on Dec. 15, 2016.

(51) Int. Cl.
| | | |
|---|---|---|
| H04N 19/82 | (2014.01) | |
| H04N 19/132 | (2014.01) | |
| H04N 19/14 | (2014.01) | |
| H04N 19/176 | (2014.01) | |
| H04N 19/50 | (2014.01) | |

(52) U.S. Cl.
CPC ........ *H04N 19/82* (2014.11); *H04N 19/132* (2014.11); *H04N 19/14* (2014.11); *H04N 19/176* (2014.11); *H04N 19/50* (2014.11)

(58) Field of Classification Search
CPC .... H04N 19/132; H04N 19/14; H04N 19/176; H04N 19/50; H04N 19/82
USPC .................................................. 375/240.12
See application file for complete search history.

(56) References Cited

U.S. PATENT DOCUMENTS

| | | | |
|---|---|---|---|
| 9,055,305 B2 | 6/2015 | Fu et al. | |
| 2003/0081854 A1 | 5/2003 | Deshpande | |
| 2007/0140574 A1* | 6/2007 | Yamaguchi | H04N 19/86 382/233 |
| 2012/0082224 A1 | 4/2012 | Van Der Auwera et al. | |

(Continued)

FOREIGN PATENT DOCUMENTS

| | | |
|---|---|---|
| CN | 104937941 A | 9/2015 |
| CN | 106127688 A | 11/2016 |

(Continued)

OTHER PUBLICATIONS

Ma et al., "De-Ringing Filter for Scalable Video Coding" (2013), IEEE, pp. 1-4. (Year: 2013).*

(Continued)

*Primary Examiner* — Jonathan R Messmore
*Assistant Examiner* — Kathleen M Walsh
(74) *Attorney, Agent, or Firm* — Leydig, Voit & Mayer, Ltd.

(57) ABSTRACT

A decoder for decoding a block of a current frame of a video from a bitstream, the decoder comprising a reference sample selection unit configured to select reference samples of a reconstructed part of the current frame, a filter unit configured to filter the reference samples, and a block generation unit configured to generate a prediction of the block based on the filtered reference samples, wherein the filter unit comprises a sharpening filter and/or a de-ringing filter.

15 Claims, 15 Drawing Sheets

(56) References Cited

U.S. PATENT DOCUMENTS

| | | | |
|---|---|---|---|
| 2014/0072048 A1* | 3/2014 | Ma | H04N 19/172 375/240.16 |
| 2014/0348222 A1 | 11/2014 | Hsiang et al. | |
| 2017/0155905 A1* | 6/2017 | Puri | H04N 19/63 |

FOREIGN PATENT DOCUMENTS

| | | | |
|---|---|---|---|
| EP | 0577350 A2 | 1/1994 | |
| WO | 2014158050 A1 | 10/2014 | |
| WO | WO-2014158050 A1 * | 10/2014 | H04N 19/33 |

OTHER PUBLICATIONS

Sychev et al., "Sharpening Filter for Interlayer Prediction" (2014), IEEE, pp. 470-473. (Year: 2014).*

Scognamiglio et al., "Enhancement of coded video sequences via an adaptive nonlinear post-processing," Signal Processing: Image Communication, vol. 18, Issue 2, XP004399839, pp. 127-139, European Association for Signal Processing (Feb. 2003).

Rossholm et al., "Low-Complex Adaptive Post Filter for Enhancement of Coded Video," 2007 9th International Symposium on Signal Processing and Its Applications, XP031280715, pp. 1-4, Institute of Electrical and Electronics Engineers - New York, New York (Feb. 12-15, 2007).

Ma et al., "De-ringing filter for Scalable Video Coding," 2013 IEEE International Conference on Multimedia and Expo Workshops (ICMEW), XP032494487, pp. 1-4, Institute of Electrical and Electronics Engineers—New York, New York (Jul. 15-19, 2013).

Sychev et al., "Sharpening filter for interlayer prediction," 2014 IEEE Visual Communications and Image Processing Conference, XP032741195, pp. 470-473, Institute of Electrical and Electronics Engineers—New York, New York (Dec. 7-10, 2014).

"Advanced video coding for generic audiovisual services," Series H: Audiovisual and Multimedia Systems, Infrastructure of audiovisual services—Coding of moving video, ITU-T H.264, pp. 1-779, International Union of Telecommunication, Geneva, Switzerland (Oct. 2016).

"High efficiency video coding," Series H: Audiovisual and Multimedia Systems, Infrastructure of audiovisual services—Coding of moving video, ITU-T H.265 v3, pp. 1-610, International Union of Telecommunication, Geneva, Switzerland (Apr. 2015).

Fu et al., "Sample Adaptive Offset in the HEVC Standard," IEEE Transactions on Circuits and Systems for Video Technology, vol. 22, No. 12, pp. 1755-1764, Institute of Electrical and Electronics Engineers—New York, New York (Dec. 2012).

Chen et al., "Further improvements to HMKTA-1.0," ITU-T 52nd Meeting, Warsaw, Poland, SG16/Q6, Doc. VCEG-A207 v2, pp. 1-9, Telecommunication Standardization Sector, International Union of Telecommunication, Geneva, Switzerland (Jun. 19-26, 2015).

Chen et al., "Improving Intra Prediction in High-Efficiency Video Coding," IEEE Transactions on Image Processing, vol. 25, Issue 8, pp. 1-13, Institute of Electrical and Electronics Engineers—New York, New York (Aug. 2016).

Said et al., "Position Dependent Intra Prediction Combination," ITU-T SG16/Q.6/16 (VCEG), COM16-C1046-E, International Union of Telecommunication, Geneva, Switzerland (Oct. 2015).

McCann et al., "Samsung's Response to the Call for Proposals on Video Compression Technology," ITU-T SG16 WP3, ISO/IEC, JTC1/SC29/WG11, Doc. Jctvc-A124, Joint Collaborative Team on Video Coding (JCTVC), pp. 1-40, International Union of Telecommunication, Geneva, Switzerland (Apr. 15-23, 2010).

Sullivan et al., "Overview of the High Efficiency Video Coding (HEVC) standard," Transactions on Circuits and Systems for Video Technology, vol. 22, No. 12, pp. 1649-1668, Institute of Electrical and Electronics Engineers—New York, New York (Dec. 2012).

"Algorithm Description of Joint Exploration Test Model 1 (JEM 1)," Coding of Moving Picture and Audio, ITU-T SG16 WP3, ISO/IEC, JTC1/SC29/WG11, Doc. N15790, International Organization for Standardization, Geneva, Switzerland (Oct. 2015).

CN/201680091413, Office Action, Jul. 17, 2020.

* cited by examiner

INTRA SHARPENING AND/OR DE-RINGING FILTER FOR VIDEO CODING

CROSS-REFERENCE TO RELATED APPLICATIONS

This application is a continuation of International Application No. PCT/RU2016/000887, filed on Dec. 15, 2016, the disclosure of which is hereby incorporated by reference in its entirety.

TECHNICAL FIELD

The present disclosure relates to a decoder and a method for decoding a block of a current frame of a video from a bitstream. The present disclosure also relates to an encoder and a method for encoding a block of a current frame in a bitstream. Further, the present disclosure also relates to a computer-readable storage medium storing program code, the program code comprising instructions for carrying out the above methods.

BACKGROUND

To reduce the bit-rate of video signals, the ISO and ITU coding standards apply hybrid video coding with inter and intra frame prediction combined with transform coding of the prediction error. Today's standards H.264/AVC and H.265/HEVC use intra-block prediction based on reference samples from already encoded surrounding blocks. Then the difference between original and predicted block (called residual) can be transformed to frequency domain using e.g. DCT or DST, quantized and coded with entropy coding.

Effectiveness of the prediction strongly influences the amount of residuals that need to be coded and transmitted. Improving the quality of prediction can reduce the amount of residual information and reduce an overall bitrate of the coded video sequence.

At the decoding side, information about prediction type and prediction parameters can be extracted from the bitstream. A prediction block can be generated according to this information. Then residuals coefficients are extracted from the bitstream, inverse quantized, transformed and added to the prediction block to get the reconstructed block. Once a full picture is reconstructed, it goes through loop filters. An obtained filtered picture goes to the output and is stored in a reference picture buffer for future inter-frame prediction.

Conventional intra prediction mechanisms in video coding use reference samples from an already encoded area to generate a prediction signal for a block that needs to be encoded.

A series of methods for improvement of intra frame prediction were proposed. Some of them were adopted in H.265/HEVC video coding standardization.

The known solutions, however, cause a distortion of the natural edges in the reference samples and correspondingly also in the prediction block that is generated from those samples. The use of a quantization matrix designed to preserve the coefficients of low frequency components can cause more errors to be generated for the blocks containing natural edge and result in blurring of edges and ringing effect around the reconstructed edges. For reducing ringing effect linear smoothing filters can be used. The problem of such approach is that together with suppression of ringing natural edges may also be blurred.

SUMMARY

An objective is to provide a decoder, an encoder and methods for decoding and encoding, wherein the decoder, the encoder and the methods overcome one or more of the above-mentioned problems of the prior art.

A first aspect of the invention provides a decoder for decoding a block of a current frame of a video from a bitstream, the decoder comprising:

a reference sample selection unit configured to select reference samples of a reconstructed part of the current frame, a filter unit configured to filter the reference samples, and a block generation unit configured to generate a prediction of the block based on the filtered reference samples, wherein the filter unit comprises a sharpening filter and/or a de-ringing filter.

The decoder of the first aspect comprises a filter unit which can filter the reference samples using the sharpening filter and/or the de-ringing filter. Experiments have shown that this sharpening and/or de-ringing of the reference samples can improve a prediction accuracy and/or perceived image quality of the predicted blocks.

The decoder of the first aspect can further comprise a reconstruction unit configured to generate a reconstructed video block on the basis of the prediction of the block and a residual video block from the received bitstream.

In a first implementation of the decoder according to the first aspect, the sharpening filter and/or the de-ringing filter is a non-linear filter.

Experiments of the inventors have shown that non-linear filters can achieve particularly good results with regard to prediction accuracy and/or perceived image quality.

In a second implementation of the decoder according to the first aspect as such or according to the first implementation of the first aspect, the decoder is configured to activate the sharpening filter and/or the de-ringing filter based on signaling of sharpening and/or the de-ringing filter related information in the bitstream and/or based on image properties of one or more reconstructed blocks of the current frame.

The decoder of the second implementation has the advantage that the sharpening filter and/or the de-ringing filter can be activated or deactivated based on whether in a given scenario an improvement of image quality is expected. Explicit signaling in the bitstream allows to achieve optimum active/inactive settings (based e.g. on an optimization of settings during the encoding process). On the other hand, activation of the sharpening filter and/or the de-ringing filter based on image properties of one or more reconstructed blocks of the current frame without explicit signaling may improve the overall coding efficiency.

To avoid the overhead of explicit signaling, the sharpening filter and/or the de-ringing filter may be activated based on e.g. a strength of edges in surrounding blocks, a coding block size etc. For example, the strength of edges in surrounding blocks and/or the coding block size can be compared with a threshold and the sharpening filter and/or the de-ringing filter be activated based on the result of the threshold comparison. For example, the sharpening filter and/or the de-ringing filter can be activated if a strength of one or more edges in nearby blocks exceeds some threshold.

In preferred embodiments, in addition to signaling of activation/deactivation of the sharpening filter and/or the de-ringing filter also further parameters may be signaled in the bitstream and/or may be derived from image properties.

The activation of the filters can be performed just for some part of the video content, e.g. a sequence, a group-of-pictures, a single picture, an arbitrary region and/or a regular coding block.

In a third implementation of the decoder according to the first aspect as such or according to any of the preceding implementations of the first aspect, the filter unit comprises:
a first derivative unit configured to determine first derivatives of the reference samples,
an absolute value unit configured to determine absolute values of the first derivatives,
a second derivative unit configured to determine second derivatives based on the absolute values of the first derivatives, and
a warping unit configured to warp the reference samples based on the second derivatives.

The decoder of the third implementation comprises a non-linear filter that in experiments has been shown to show particularly good results allowing to suppress ringing artifacts and to increase subjective sharpness of natural edge.

In a fourth implementation of the decoder according to the first aspect as such or according to any one of the preceding implementations of the first aspect, the warping unit is configured to displace each of the reference samples with a respective displacement vector obtained by scaling the second derivatives with a scaling coefficient, wherein the scaling coefficient is the sharpening strength.

In a fifth implementation of the decoder according to the first aspect as such or according to any of the preceding implementations of the first aspect, the decoder is configured to adapt the scaling coefficient based on signaling in the bitstream and/or based on local image properties.

For example, the value of the scaling coefficient can be explicitly indicated in the bitstream. Alternatively, the overhead of explicit signaling can be avoided by adapting the scaling coefficient based on local image properties, e.g. based on a measured strength of one or more edges in blocks already decoded from the bitstream.

In a sixth implementation of the decoder according to the first aspect as such or according to any of the preceding implementations of the first aspect, the filter unit further comprises a clipping unit that is configured to limit the absolute value to be above a first threshold and/or below a second threshold.

The decoder of the sixth implementation has the advantage that extremely high values of the absolute values of the first derivatives are clipped, thus avoiding extreme outliers that might lead to image quality degradation.

In a seventh implementation of the decoder according to the first aspect as such or according to any of the preceding implementations of the first aspect, further comprising a blurring filter configured to smooth the absolute values.

For example, the blurring filter can be a Gaussian filter.

A second aspect of the invention refers to an encoder for encoding a block of a current frame in a bitstream, the encoder comprising:
a reference sample selection unit configured to select reference samples of a reconstructed part of the current frame,
a filter unit configured to filter the reference samples,
a block generation unit configured to generate a prediction of the block based on the filtered reference samples, wherein the filter unit comprises a sharpening filter and/or a de-ringing filter, and
a control unit configured to control whether to apply the sharpening filter and/or the de-ringing filter.

The encoder of the second aspect can be configured to encode the block of the current frame in the bitstream such that it can be decoded by the decoder according to the first aspect of the invention.

The encoder of the second aspect can further comprise a reconstruction unit configured to generate a reconstructed video block on the basis of the prediction of the block and a residual video block.

In a first implementation of the encoder of the second aspect, the control unit is configured to select one of:
a selective bypass, and
a selective application of the sharpening and/or de-ringing filter
by performing a rate-distortion optimization, by minimizing a prediction error criterion and/or based on one or more local image properties.

In this way, the encoder of the second aspect can determine an optimum filtering (or bypass of filtering). The encoder can be configured to encode the selection into the bitstream, e.g. via explicit signalling of the selection.

In a second implementation of the encoder of the second aspect as such or according to the first implementation of the second aspect, the filter comprises one or more parameters and the encoder further comprises a parameter selection unit configured to select the one or more parameters by performing a rate-distortion optimization, by minimizing a prediction error criterion and/or based on one or more local image properties.

In a third implementation of the encoder of the second aspect as such or according to the first implementation of the second aspect, the encoder is configured to encode a sharpening filter flag, a sharpening coefficient and/or one or more parameters of the sharpening and/or de-ringing filter in the bitstream.

A third aspect of the invention refers to a method for decoding a block of a current frame of a video from a bitstream, the method comprising:
selecting reference samples of a reconstructed part of the current frame,
filtering the reference samples, and
generating a prediction of the block based on the filtered reference samples,
wherein filtering the reference samples comprises a step of sharpening and/or de-ringing the reference samples.

The methods according to the third aspect of the invention can be performed by the decoder according to the first aspect of the invention. Further features or implementations of the method according to the third aspect of the invention can perform the functionality of the decoder according to the first aspect of the invention and its different implementation forms.

A fourth aspect of the invention refers to a method for encoding a block of a current frame of a video in a bitstream, the method comprising:
selecting reference samples of a reconstructed part of the current frame,
filtering the reference samples, and
generating a prediction of the block based on the filtered reference samples,
wherein the method further comprises a step of deciding whether to filter the reference samples by sharpening and/or de-ringing.

The methods according to the fourth aspect of the invention can be performed by the encoder according to the second aspect of the invention. Further features or implementations of the method according to the fourth aspect of the invention can perform the functionality of the encoder according to the second aspect of the invention and its different implementation forms.

A fifth aspect of the invention refers to a computer-readable storage medium storing program code, the program code comprising instructions for carrying out the method of the third or the fourth aspect.

A sixth aspect of the invention provides a decoder for decoding a block of a current frame of a video from a bitstream, the decoder comprising:
a reference sample selection unit configured to select reference samples of a reconstructed part of the current frame,
a filter unit configured to filter the reference samples, and
a block generation unit configured to generate a prediction of the block based on the filtered reference samples, wherein the filter unit comprises a sharpening filter and/or a deringing filter configured to be applied based on a flag in the bitstream.

The decoder of the sixth aspect has the advantage that the sharpening filter and/or the de-ringing filter can improve efficiency of prediction leading to better objective and perceived image quality. In particular, since the sharpening filter and/or the de-ringing filter can be applied based on the flag in the bitstream, these filters can be selectively applied in scenarios where they lead to an improved image quality.

The decoder of the sixth aspect can further comprise a reconstruction unit configured to generate a reconstructed video block on the basis of the prediction of the block and a residual video block from the bitstream.

In a first implementation of the decoder according to the sixth aspect, the filter unit and/or the block generation unit and/or a prediction post-filtering unit, which is configured to filter the prediction of the block, comprises a smoothing filter.

The decoder according to the first implementation has the advantage that it comprises both a sharpening filter/deringing filter and a smoothing filter. Thus, depending on circumstances it can apply either sharpening or smoothing, thus achieving optimum image reproduction.

The decoder can be configured to apply, based on one flag in the bitstream, either:
the smoothing filter, or
the sharpening filter and/or the de-ringing filter.

For example, if the flag in the bitstream is true, the decoder can be configured to apply the smoothing filter and if the flag is false it can be configured to apply the sharpening filter and/or the de-ringing filter.

This has the advantage that it is avoided that opposite actions of smoothing and sharpening are applied at the same time.

The decoder can be configured to apply the smoothing filter based on a rule which is based on one or more block properties, unless a sharpening flag in the bitstream is true.

In a second implementation of the decoder according to the sixth aspect as such or according to the first implementation of the sixth aspect, the decoder is configured to:
determine a smoothing filtering condition,
parse a sharpening flag from the bitstream, and
if the smoothing filtering condition is true and the sharpening flag is false, apply the smoothing filter.

In other words, according to the second implementation the smoothing filter is applied only if both the smoothing filtering condition is fulfilled and sharpening is deactivated. Thus, it is avoided that opposite actions of smoothing and sharpening are performed at the same time.

In a third implementation of the decoder according to the sixth aspect as such or according to any of the preceding implementations of the first aspect, the decoder is configured to:
parse a sharpening flag from the bitstream, and
if sharpening flag is false, parse a smoothing flag from bitstream, and/or wherein the decoder is configured to:
parse a smoothing flag from the bitstream, and
if smoothing flag is false, parse a sharpening flag from bitstream.

In other words, parsing of a smoothing flag may be skipped if the sharpening flag is true (which results in the sharpening filter being applied). Similarly, parsing of a sharpening flag may be skipped if a smoothing flag is true (which results in the smoothing filter being applied). This has the advantage that less information needs to be parsed from the bitstream. Thus, a coding efficiency can be improved.

In a fourth implementation of the decoder according to the sixth aspect as such or according to any of the preceding implementations of the sixth aspect, the block generation unit comprises a plurality of prediction modes comprising a DC mode, a planar mode and/or one or more angular modes, and the decoder is further configured to:
parse a prediction mode from the bitstream, and
if the parsed prediction mode is neither the DC mode nor the planar mode, parse a sharpening flag from bitstream.

In other words, if the parsed prediction mode is DC mode or planar mode, the decoder skips parsing the sharpening flag from the bitstream. The reason for this is that the DC mode and the planar mode can be seen as smoothing filters. Thus, the decoder can assume that if DC mode or planar mode is used for prediction, sharpening should be avoided. Thus, there is no need to parse the sharpening flag if the prediction mode is DC mode or planar mode. The fourth implementation thus has the advantage that unnecessary parsing of flags can be avoided and a coding efficiency can be improved.

In a fifth implementation of the decoder according to the sixth aspect as such or according to any of the preceding implementations of the sixth aspect, the block generation unit comprises a plurality of interpolation filters with different frequency response characteristics configured to obtain sample values in fractional pixel positions, and the decoder is further configured to:
parse a sharpening flag from the bitstream, and
if the sharpening flag is true, apply an interpolation filter from the plurality of interpolation filters which passes a maximum amount of high frequencies.

For example, if Cubic and blurring filters (such as Gaussian or bi-linear) are available, if the sharpening flag is true, the Cubic filter should be applied because this passes a higher amount of high frequencies.

In a sixth implementation of the decoder according to the sixth aspect as such or according to any of the preceding implementations of the sixth aspect, the smoothing filter comprises:
a DC mode and/or a planar mode of a block prediction method,
a boundary smoothing filter,
a position-dependent intra prediction combination and/or a multi parameter intra prediction.

Position-dependent intra prediction combination (PDPC) is a post-processing for block prediction which invokes a combination of HEVC Block prediction with filtered and unfiltered boundary reference samples. A few 7-tap low pass filter is used to smooth the boundary samples. As a result pixels of the prediction block become smoothed depending on their position in the block.

Multi-parameter intra prediction (MPI) is a post-processing tool for intra prediction which invokes additional smoothing with decoded boundary. The purpose of MPI is to generate more natural patterns by applying different post processing filters to the prediction results while maintaining the directional patterns even after the smoothing.

In a seventh implementation of the decoder according to the sixth aspect as such or according to any of the preceding implementations of the sixth aspect, the smoothing filter is a Gaussian filter and the block generation unit is configured to use a Cubic filter instead of the Gaussian filter if the sharpening filter is used.

A seventh aspect of the invention refers to an encoder for encoding a block of a current frame of a video in a bitstream, the encoder comprising:
- a reference sample selection unit configured to select reference samples of reconstructed part of the current frame,
- a filter unit configured to filter the reference samples, wherein the filter unit comprises a sharpening filter and/or a de-ringing filter,
- a block generation unit configured to generate a prediction of the block based on the filtered reference samples, and
- a control unit configured to control whether to apply the sharpening filter and/or the de-ringing filter.

The encoder can be configured to calculate a target criterion for each of a plurality of encoding modes, wherein each of the plurality of encoding modes applies either a sharpening filter or a smoothing filter, and wherein the encoder is configured to select a preferred encoding mode based on the calculated target criteria.

The encoder may further comprise a write unit that is configured to write a flag into the bit-stream, wherein the flag indicates whether a sharpening filter and/or a de-ringing filter should be used during decoding.

In a first implementation of the encoder of the seventh aspect, the filter unit and/or the block generation unit and/or a post-filtering unit, which is configured to filter the prediction of the block, comprises a smoothing filter.

In a second implementation of the encoder of the seventh aspect as such or according to the first implementation of the seventh aspect, the encoder is configured to:
- write a sharpening flag to the bitstream, and
- if the sharpening flag is false, write a smoothing flag to the bitstream, and/or wherein the encoder is configured to:
- write a smoothing flag to the bitstream, and
- if the smoothing flag is false, write a sharpening flag to the bitstream.

In a third implementation of the encoder of the seventh aspect as such or according to any of the preceding implementations of the seventh aspect, the block generation unit comprises a plurality of prediction modes comprising a DC mode, a planar mode and/or one or more angular modes, and the decoder is further configured to:
- determine a prediction mode, and
- if the determined prediction mode is neither the DC mode nor the planar mode, write a sharpening flag to the bitstream.

An eighth aspect of the invention refers to a method for decoding a block of a current frame of a video from a bitstream, the method comprising:
- selecting reference samples of a reconstructed part of the current frame,
- filtering the reference samples,
- generating a prediction of the block based on the filtered reference samples,
wherein the method further comprises a step of deciding, based on a flag in the bitstream, whether filtering the reference samples comprises a step of applying a sharpening filter and/or a de-ringing filter.

The methods according to the eighth aspect of the invention can be performed by the decoder according to the sixth aspect of the invention. Further features or implementations of the method according to the eighth aspect of the invention can perform the functionality of the decoder according to the sixth aspect of the invention and its different implementation forms.

A ninth aspect of the invention refers to a method for encoding a block of a current frame of a video in a bitstream, the method comprising:
- selecting reference samples of a reconstructed part of the current frame,
- filtering the reference samples,
- generating a prediction of the block based on the filtered reference samples,
wherein the method further comprises a step of deciding whether filtering the reference samples comprises a step of applying a sharpening filter and/or a de-ringing filter.

The method can further comprise: determining a target criterion for the predicted block, and selecting a preferred encoding mode based on the determined target criteria.

The methods according to the ninth aspect of the invention can be performed by the encoder according to the seventh aspect of the invention. Further features or implementations of the method according to the ninth aspect of the invention can perform the functionality of the encoder according to the seventh aspect of the invention and its different implementation forms.

A tenth aspect of the invention refers to a computer-readable storage medium storing program code, the program code comprising instructions for carrying out the method of the eighth and ninth aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

DETAILED DESCRIPTION OF THE EMBODIMENTS

Figure 1:
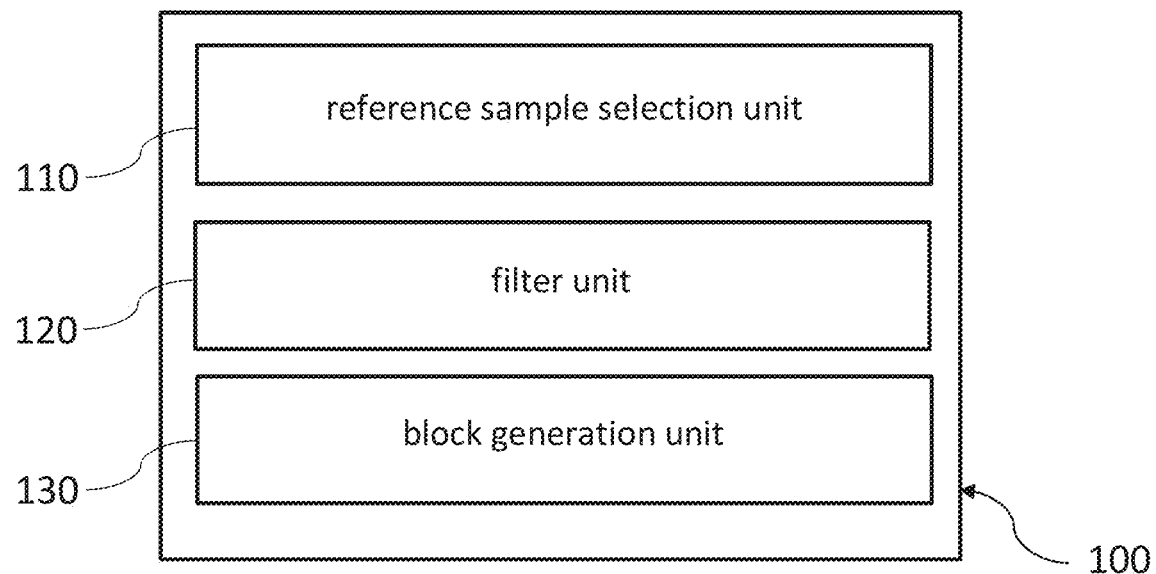
FIG. 1 is a block diagram illustrating a decoder for decoding a block of a current frame of a video from a bitstream.

FIG. 1 shows a decoder 100 for decoding a block of a current frame of a video from a bitstream.

The decoder 100 comprises a reference sample selection unit 110, a filter unit 120 and a block generation unit 130.

The reference sample selection unit 110 is configured to select reference samples of a reconstructed part of the current frame. Selection of the reference samples can be done according to conventional schemes.

The filter unit 120 is configured to filter the reference samples, wherein the filter unit 120 comprises a sharpening filter and/or a de-ringing filter. These filters may be configured based on signaling in the bitstream and/or based on image properties, e.g. based on image properties of already reconstructed blocks.

The block generation unit 130 is configured to generate a prediction of the block based on the filtered reference samples.

Figure 2:
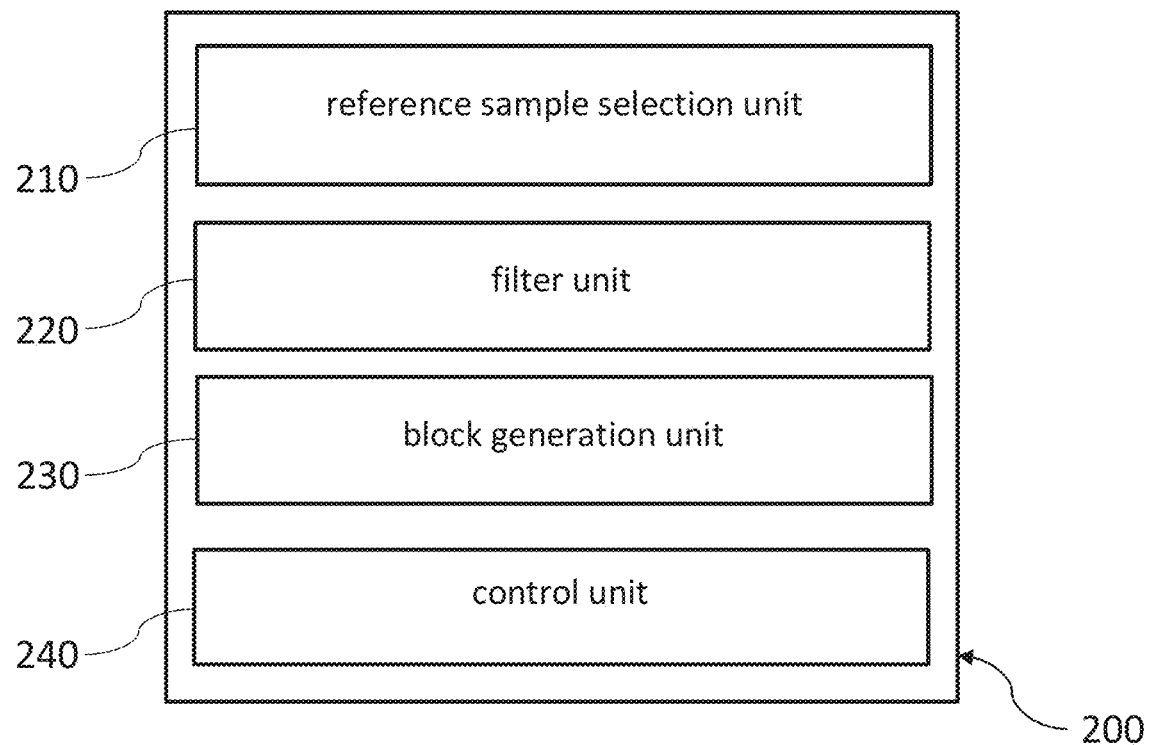
FIG. 2 is a block diagram illustrating an encoder for encoding a block of a current frame in a bitstream.

FIG. 2 shows an encoder 200 for encoding a block of a current frame in a bitstream.

The encoder comprises a reference sample selection unit 210, a filter unit 220, a block generation unit 230 and a control unit 240.

The reference sample selection unit 210 is configured to select reference samples of a reconstructed part of the current frame. Selection of the reference samples can be done according to conventional schemes.

The filter unit 220 is configured to filter the reference samples and comprises a sharpening filter and/or a de-ringing filter.

The block generation unit 230 configured to generate a prediction of the block based on the filtered reference samples.

The control unit 240 configured to control whether to apply the sharpening filter and/or the de-ringing filter.

A more detailed description of a possible implementation of the decoder 100 and encoder 200 will be given in the following with reference to FIGS. 5 and 6.

Figure 3:
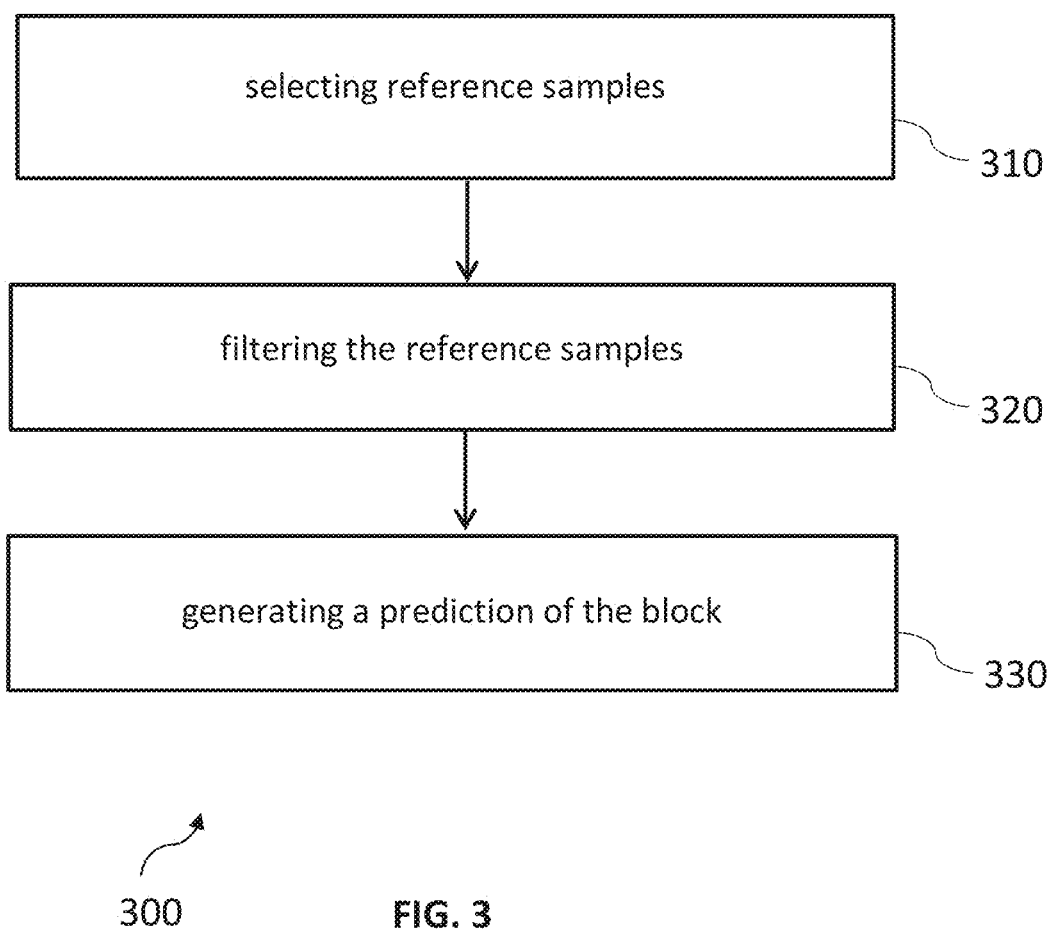
FIG. 3 is a flow chart of a method for decoding a block of a current frame of a video from a bitstream.

FIG. 3 shows a method 300 for obtaining of prediction block of a current frame of a video from a bitstream.

The method 300 comprises a first step of selecting 310 reference samples of a reconstructed part of the current frame.

The method 300 comprises a second step of filtering 320 the reference samples.

The method comprises a third step of generating 330 a prediction of the block based on the filtered reference samples, wherein filtering the reference samples comprises a step of sharpening and/or de-ringing the reference samples.

Figure 4:
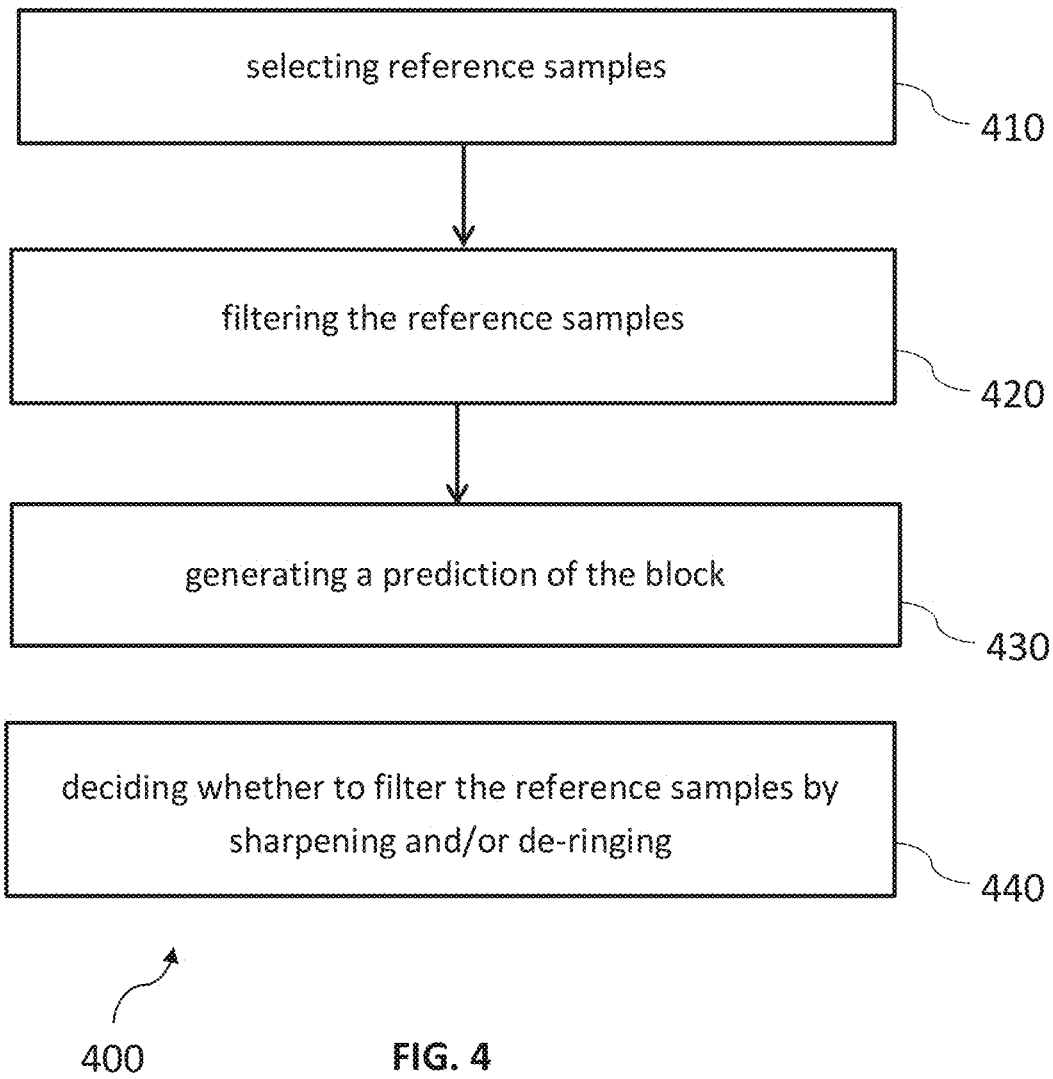
FIG. 4 is a flow chart of a method for encoding a block of a current frame of a video from a bitstream.

FIG. 4 shows a method 400 for encoding a block of a current frame of a video in a bitstream.

The method comprises a first step of selecting 410 reference samples of a reconstructed part of the current frame.

The method comprises a second step of filtering 420 the reference samples.

The method comprises a third step of generating 430 a prediction of the block based on the filtered reference samples, wherein the method further comprises a step of deciding whether to filter the reference samples by sharpening and/or de-ringing.

Figure 5:
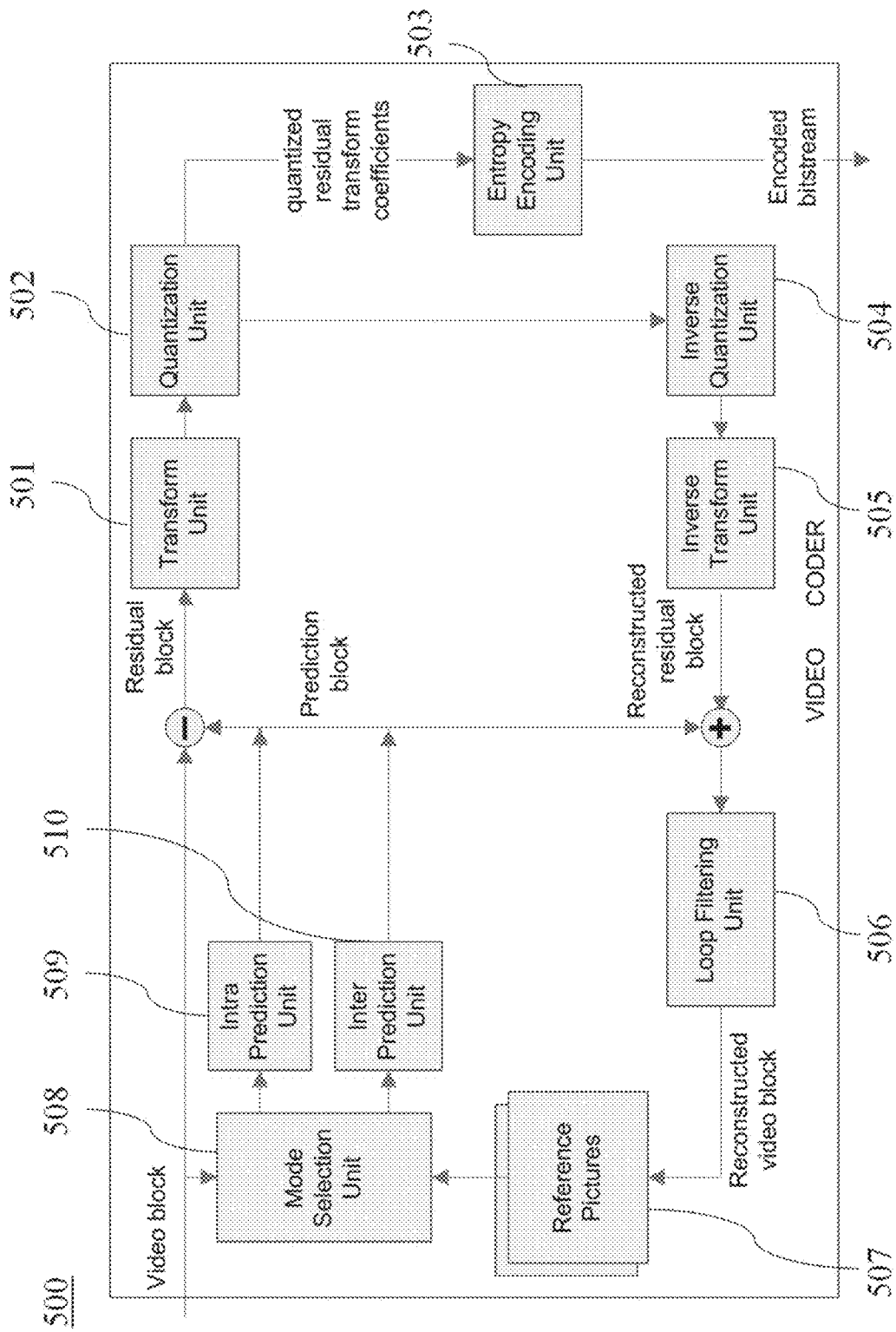
FIG. 5 is a block diagram of a further encoder for encoding a block of a current frame in a bitstream.

FIG. 5 shows an encoder 500 which comprises an input for receiving input blocks of frames or pictures of a video stream and an output for generating an encoded video bitstream. In an explicative realization the encoder 500 is adapted to apply prediction, transformation, quantization, and entropy coding to the video stream. The transformation, quantization, and entropy coding are carried out respectively by a transform unit 501, a quantization unit 502 and an entropy encoding unit 503 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit 509. An intra frame is coded using only the information within the same frame, so that it can be independently decoded and it can provide an entry point in the bitstream for random access. Blocks of other frames of the video stream are inter coded by means of an inter prediction unit 510: information from coded frames, which are called reference frames, are used to reduce the temporal redundancy, so that each block of an inter-coded frame is predicted from a block in a reference frame. A mode selection unit 508 is adapted to select whether a block of a frame is to be processed by the intra prediction unit 509 or the inter prediction unit 510. This block also controls the parameters of intra of inter prediction.

The intra prediction unit 509 is a block prediction unit. It comprises a sharpening filter and/or a de-ringing filter (not shown in FIG. 5).

For performing spatial or temporal prediction, the coded blocks may be further processed by an inverse quantization unit 504, an inverse transform unit 505. After reconstruction of whole frame a loop filtering unit 506 is applied so as to obtain the reference frames that are then stored in a frame buffer 507.

The inter prediction unit 510 comprises as input a block of a current frame or picture to be inter coded and one or several reference frames or pictures from the frame buffer 507. Motion estimation and motion compensation are applied by the inter prediction unit 510. The motion estimation is used to obtain a motion vector and a reference frame based on certain cost function. The motion compensation then describes a current block of the current frame in terms of the transformation of a reference block of the reference frame to the current frame. The inter prediction unit 510 outputs a prediction block for the current block, wherein said prediction block minimizes the difference between the current block to be coded and its prediction block, i.e. minimizes the residual block. The minimization of the residual block is based e.g. on a rate-distortion optimization procedure.

The intra prediction unit 509 receives as input a block of a current frame or picture to be intra coded and one or several reference samples from an already reconstructed area of a current picture. The intra prediction then describes a current block of the current frame in terms of the transformation of reference samples of the current frame to the currently coded block. The intra prediction unit 509 outputs a prediction block for the current block, wherein said prediction block minimizes the difference between the current block to be coded and its prediction block, i.e., it minimizes the residual block. The minimization of the residual block can be based e.g. on a rate-distortion optimization procedure.

The difference between the current block and its prediction, i.e. the residual block, is then transformed by the transform unit 501. The transform coefficients are quantized and entropy coded by the quantization unit 502 and the entropy encoding unit 503. The thus generated encoded video bitstream comprises intra coded blocks and inter coded blocks.

Figure 6:
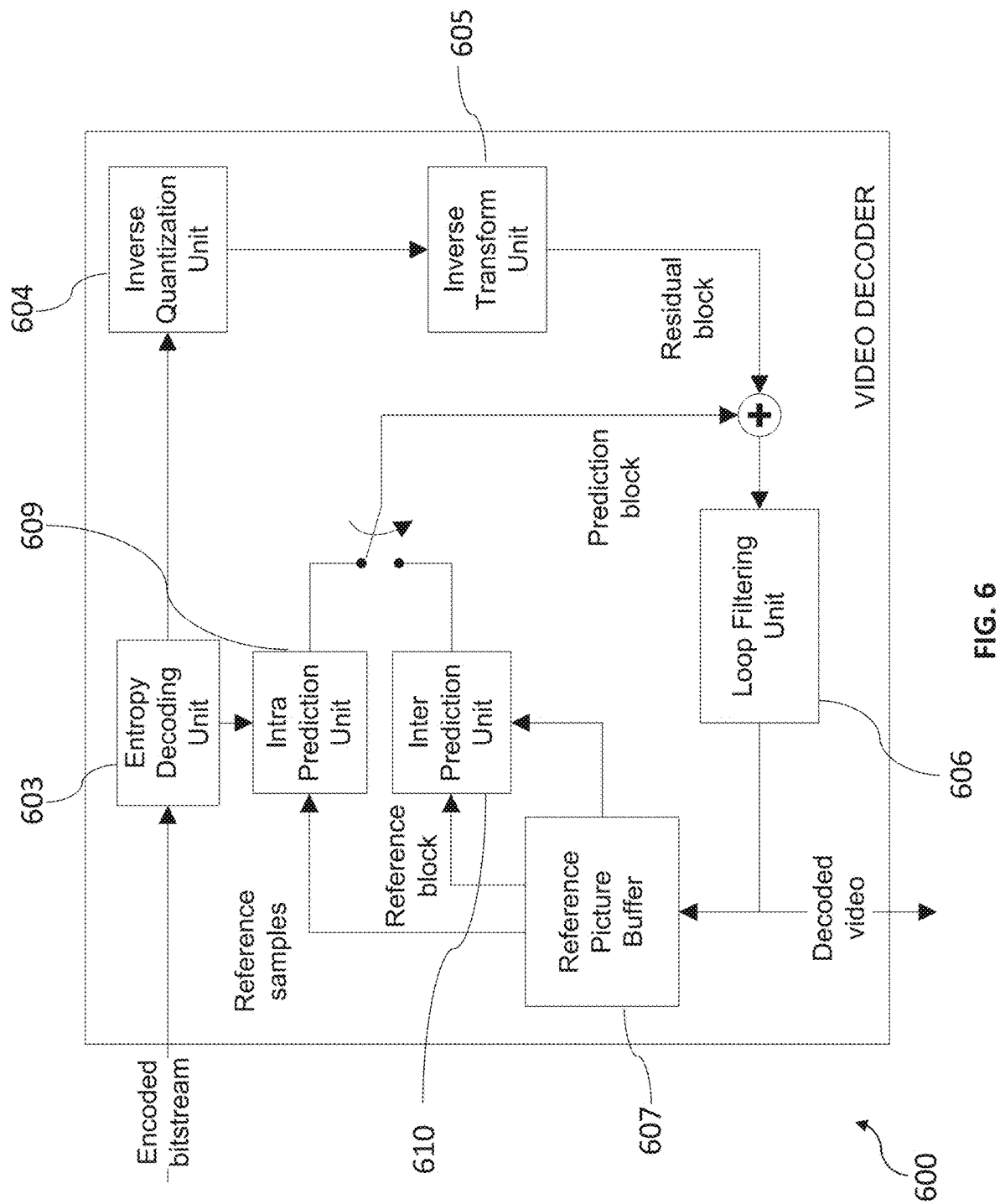
FIG. 6 is a block diagram of a further decoder for decoding a block of a current frame of a video from a bitstream.

FIG. 6 shows a video decoder 600. The video decoder 600 comprises particularly a reference picture buffer 607 and an intra prediction unit 609, which is a block prediction unit and which comprises a sharpening filter and/or a de-ringing filter. The reference picture buffer 607 is adapted to store at least one reference frame obtained from the encoded video bitstream, said reference frame being different from a current frame of the encoded video bitstream. The intra prediction unit 609 is configured to generate a prediction block, which is an estimate of the block to be decoded. The intra prediction unit 609 is configured to generate this prediction based on reference samples that are obtained from the reference picture buffer 607. The intra prediction unit 609 is configured to use the sharpening filter and/or the de-ringing filter to sharpen and/or de-ring reference samples obtained from the reference picture buffer.

The decoder 600 is adapted to decode the encoded video bitstream generated by the video encoder 500, and preferably both the decoder 600 and the encoder 500 generate identical predictions. The features of the reference picture buffer 607 and the intra prediction unit 609 are similar to the features of the reference picture buffer 507 and the intra prediction unit 509 of FIG. 5.

Particularly, the video decoder 600 comprises further units that are also present in the video encoder 600 like e.g. an inverse quantization unit 604, an inverse transform unit 605, a loop filtering unit 606 and an intra prediction unit 609, which respectively correspond to the inverse quantization unit 504, the inverse transform unit 505, the loop filtering unit 506 and the intra prediction unit 509 of the video coder 500.

An entropy decoding unit 603 is adapted to decode the received encoded video bitstream and to correspondingly obtain quantized residual transform coefficients and, if present, sharpening filter information. The quantized residual transform coefficients are fed to the inverse quantization unit 604 and an inverse transform unit 605 to generate a residual block. The residual block is added to a prediction block and the addition is fed to the loop filtering unit 606 to obtain the decoded video. Frames of the decoded video can be stored in the reference picture buffer 607 and serve as a reference frame for inter prediction.

Figure 7:
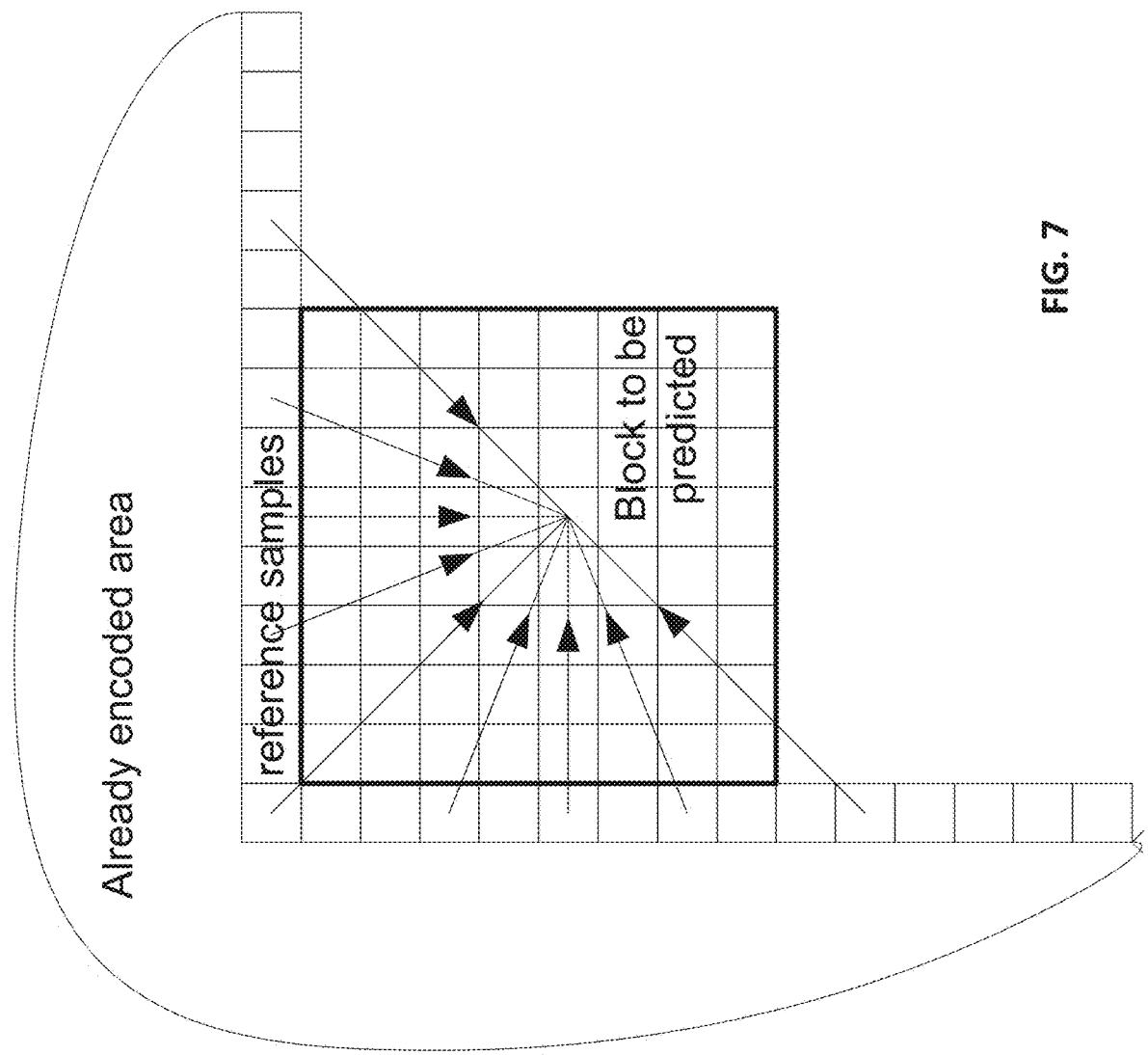
FIG. 7 is a schematic illustration of an intra prediction method.

Generally, the intra prediction units 509 and 609 of FIGS. 5 and 6 can use reference samples from an already encoded area to generate prediction signals for blocks that need to be encoded or need to be decoded (see FIG. 7).

FIG. 7 illustrates an intra-prediction of block 730 based on a plurality of reference samples 720 that are part of an already encoded area 710. As indicated in FIG. 7 with arrows 740, the block 730 is predicted based on the plurality of reference samples. In particular, a plurality of reference samples may be used to predict an individual pixel of the block 730. The reference samples 720 may be selected from the already encoded area e.g. as a vertical and horizontal line of reference samples that surround the block to be predicted.

Figure 8:
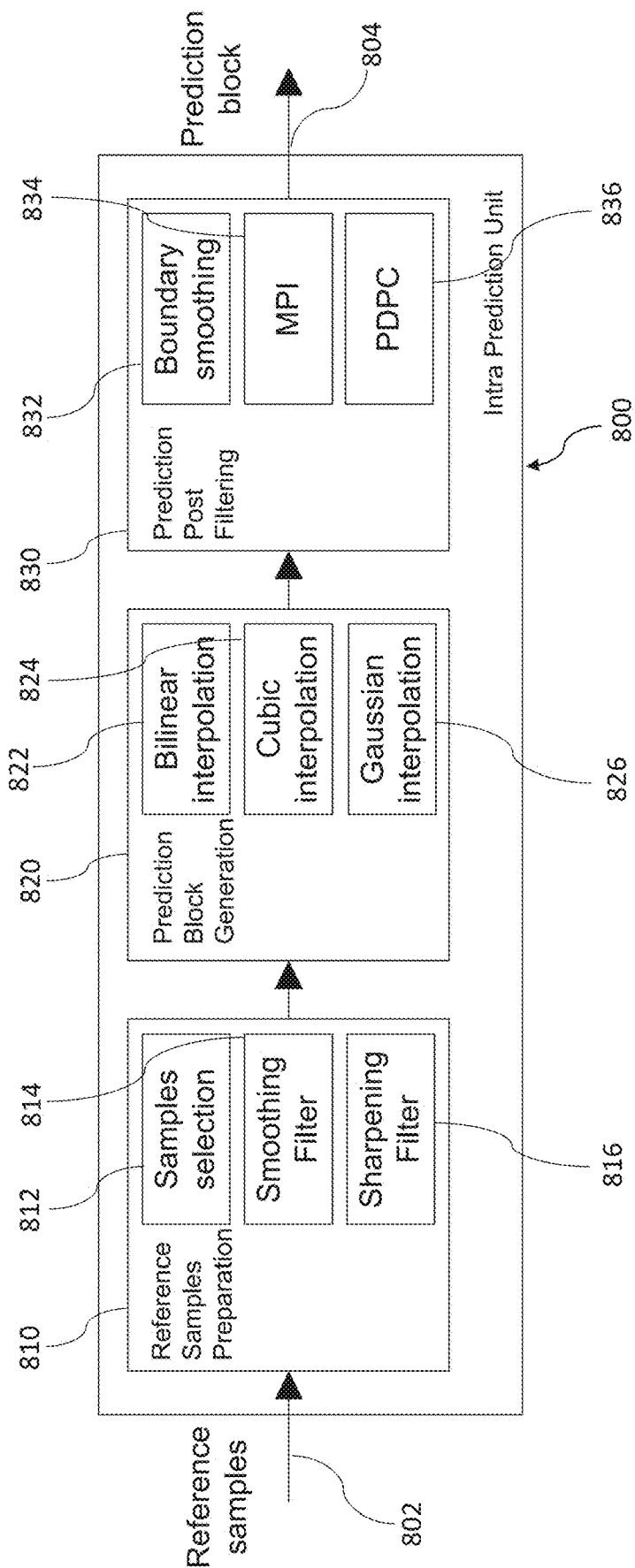
FIG. 8 is a block diagram of an intra prediction unit.

FIG. 8 is a block diagram of an intra prediction unit 800. The intra prediction unit 800 may be an implementation of the intra prediction units 509 and 609 of FIGS. 5 and 6 according to an implementation of the present invention and comprises three major blocks:

A reference samples preparation unit 810. In this unit, reference samples are defined and pre-processed according to selected prediction mode, block size and samples availability. These steps can be performed by a reference sample preparation unit 812, a smoothing filter 814 and a sharpening filter 816 of the reference samples preparation unit 810.

2. A prediction block generation unit 820 for the generation of the prediction block. In this unit, reference samples are extrapolated to a prediction block according to chosen prediction mode (angular, planar or DC). To generate prediction block reference samples need to be known in their fractional sampling positions. To get these values interpolation filters are used. It may be e.g. simple bi-linear filter or more sophisticated Gaussian or Cubic based filters to get more accurate interpolation. These steps can be carried out by bilinear interpolation unit 822, a cubic interpolation unit 824 and a Gaussian interpolation unit 826 of the prediction block generation unit 820.

3. A prediction post-filtering unit 830 for post-filtering of the prediction block. For further increasing of prediction efficiency the prediction block additionally filtered before taking the residual. For instance, an intra-boundary filter can be used to smooth differences on borders between predicted and already coded neighboring blocks. Multi-Parameter Intra prediction (MPI) and Position Dependent intra Prediction Combination (PDPC) both aim to blur different parts of prediction blocks with different strength. These steps can be carried out by a boundary smoothing unit 832, a MPI unit 834 and a PDPC unit 836 of the prediction post-filtering unit 830.

At the reference samples preparation unit 810, along with unprocessed reference samples and smoothed reference samples sharpened (and/or de-ringed) reference samples are obtained by applying a sharpening (and/or de-ringing) filter to reference samples. A decision about what type of pre-processing should be used can be made by the encoder e.g. during a rate-distortion optimization procedure (based on cost or minimum prediction error criterion) or based on some a-priori defined rules (e.g. based on a block size, a prediction mode, etc.).

Figure 9:
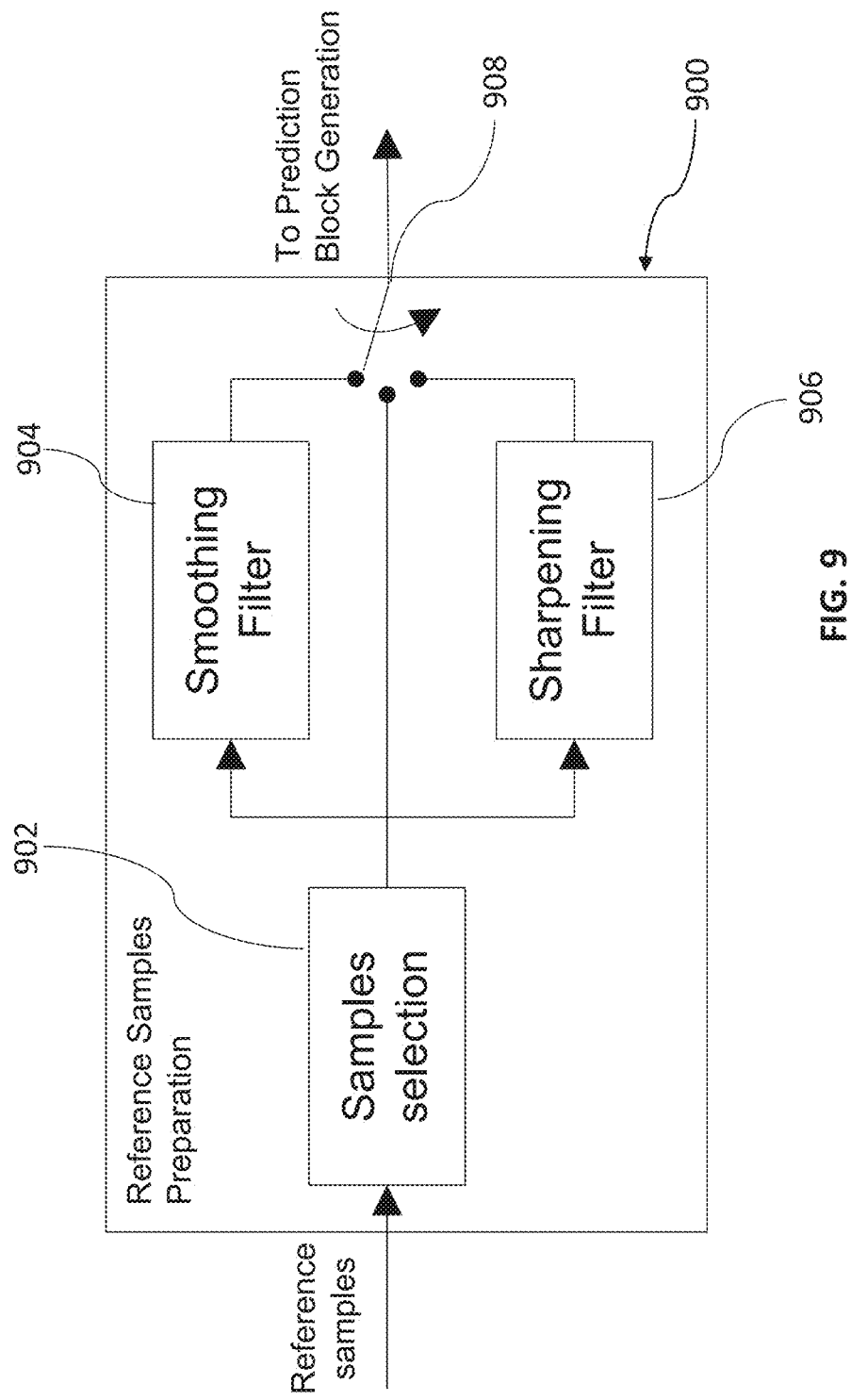
FIG. 9 is a block diagram of a reference samples preparation unit.

FIG. 9 is a block diagram of a reference samples preparation unit 900. The reference samples preparation unit 900 comprises a samples selection unit 902, a smoothing filter 904 and a sharpening filter 906. Furthermore, it comprises a switch 908 that is configured to switch between the smoothing filter 904, the sharpening filter 906 and a bypass connection, wherein the filters are bypassed.

Preferably, the sharpening filter 906 of FIG. 9 is a non-linear warping-based sharpening filter.

Figure 10:
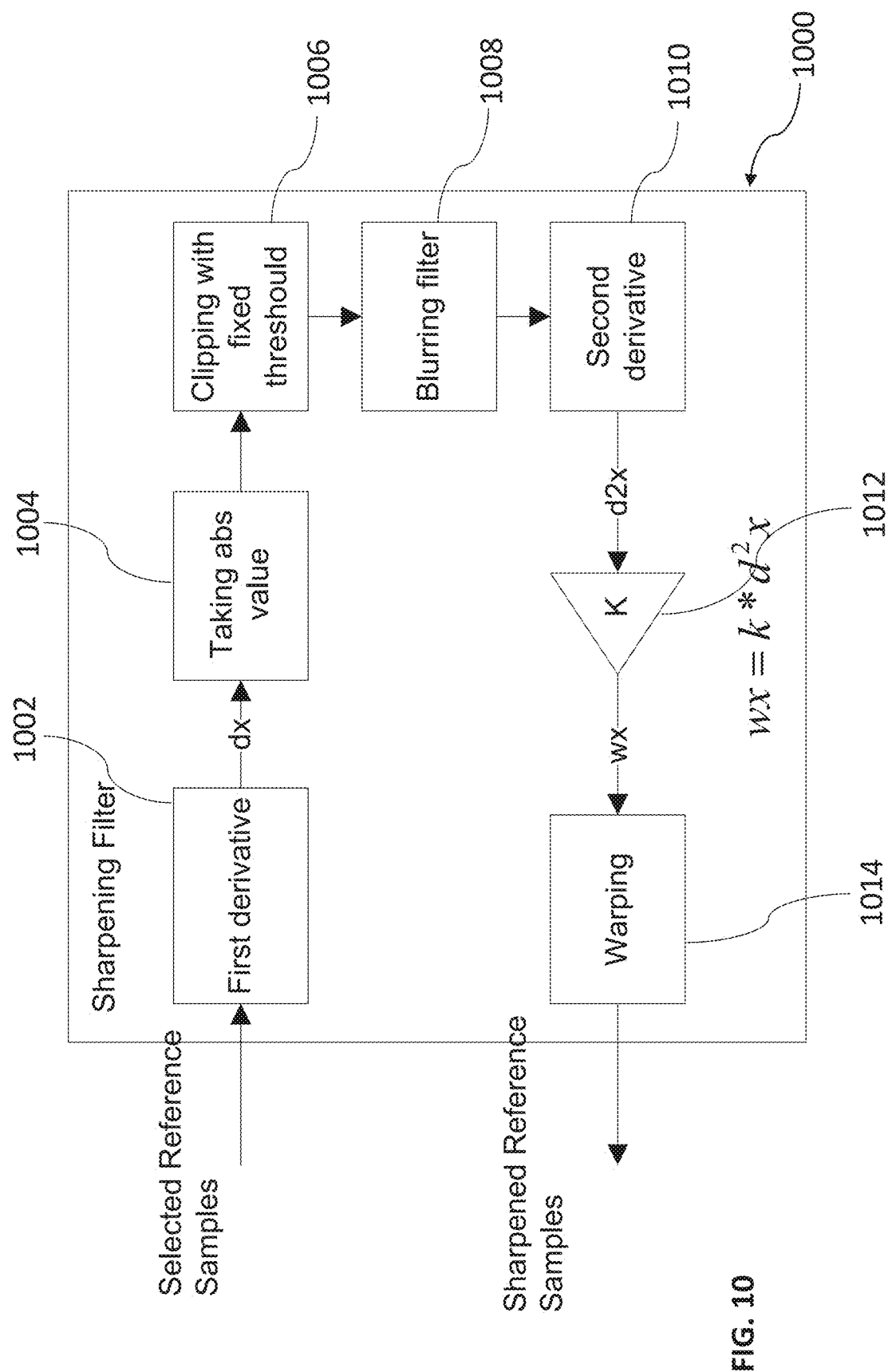
FIG. 10 is a block diagram of a sharpening filter.

FIG. 10 illustrates an example of a non-linear warping-based sharpening filter 1000. The filter 1000 comprises a first derivative unit 1002, an absolute value unit 1004, a clipping unit 1006, a blurring filter 1008, a second derivative unit 1010, a multiplier 1012 and a warping unit 1014. These units 1002-1014 are connected sequentially. In particular, the units 1002-1014 of the filter 1000 are configured to sequentially carry out the following steps:

1. Obtaining a gradient of a line of reference samples by taking a first derivative (dx).
2. Obtaining edge map by calculating a gradient vector length.

3. Clipping of edge map with thresholds to prevent processing of extremely high and/or extremely low values.
4. Blurring of clipped edge map e.g. by Gaussian filter.
5. Taking second derivative (d2x).
6. Obtaining displacement vector (wx) by scaling of second derivative vector d2x with coefficient k. Coefficient k is considered as sharpening strength and can be adaptively selected to better fit local image properties e.g. by a rate-distortion optimization procedure or by minimum of prediction error criterion. Alternatively, the scaling coefficient can be indicated through explicit signaling in the bitstream.
7. Warping e.g. with bilinear interpolation using obtained displacement vector.

This non-linear warp-based sharpening filter can achieve both types of improvement: increasing sharpness of natural edges and removing ringing artifacts around edges.

Traditional edge enhancement techniques based on linear sharpening (or de-blurring) filters like "unsharp masking" may increase subjective quality, but typically cannot suppress ringing artifacts caused by residual quantization. In many cases, they even increase ringing and reduce objective performance characteristics. In many cases, non-linear filters can provide better results for ringing elimination and enhance both subjective and objective quality of edges.

Adding a sharpening filter, such as e.g. the sharpening filter 1000 of FIG. 10, to reference samples processing allows to:
  reduce an amount of high frequency residuals by improving quality of intra-prediction in presence of natural edges;
  reduce a blurring of edges caused by quantization of reference samples; and
  increase both subjective and objective quality of edges in prediction signal and then in turn reconstructed pictures.

Adding a sharpening filter of a specific structure (non-linear, warping based, adaptive) allows to:
  reduce ringing artifact caused by quantization of transform coefficient of reference samples together with incensement sharpening of natural edges;
  perform spatial adaptation with limited signaling overhead due to simple adaptive form of filter with just one coefficient for adaptation and transmission.

Preferably, an adaptation coefficient is changeable for some parts of content: sequence, group-of-pictures, coding picture, arbitrary region or regular coded block of any size (e.g. CTU, CU, PU, TU using HEVC terminology). To let decoder know about changed interpolation filter sets it should be signaled to decoder or derived on decoder side without explicit signaling.

A sharpening (and/or de-ringing) filter can be always enabled or switchable on/off. A decision about enabling or disabling a sharpening filter in each particular block of coded image (e.g. CTU, CU, PU, TU in H.265/HEVC terminology) can be chosen by encoder e.g. by minimization of a prediction error or a cost (rate/distortion) criterion and signaled in the bitstream with a 1-bit flag.

The filter 1000 allows increasing subjective sharpness of natural edges and suppressing ringing artifacts near to edges caused by quantization of reference samples. However further steps of prediction signal generation and post-filtering may cause natural edges be blurred again. To avoid this, running of sharpening and blurring tools simultaneously can be explicitly disabled. Such design reduces overhead generated by signaling of each particular prediction enhancement tool and reduces a complexity of an encoder by eliminating contradictory combinations from processing.

Preferably, if further steps of obtaining prediction signal contain tools that cause blurring (e.g. DC and Planar prediction mode, Gaussian Interpolation filter, bi-linear interpolation filter, MPI, PDPC, Boundary Prediction filter) then a combination of such tools with sharpening is excluded from processing and signaling.

The effects of sharpening and de-ringing can sometimes be achieved by just one filter. However, there are also cases where only sharpening or only de-ringing is desired, and special filters for only one of the two purposes are provided.

Depending on the particular configuration, the enabling of the sharpening filter does not always cause disabling of all possible blurring tools. Some of them may be disabled and some of them not. Such combinations may have improved performance.

Further modifications are addressed to next steps of intra prediction—Prediction Block Generation and Prediction post filtering. The Prediction Block Generation uses two interpolation filters. One is preserving high frequencies Cubic filter, the second is a low-pass Gaussian filter.

Figure 11:
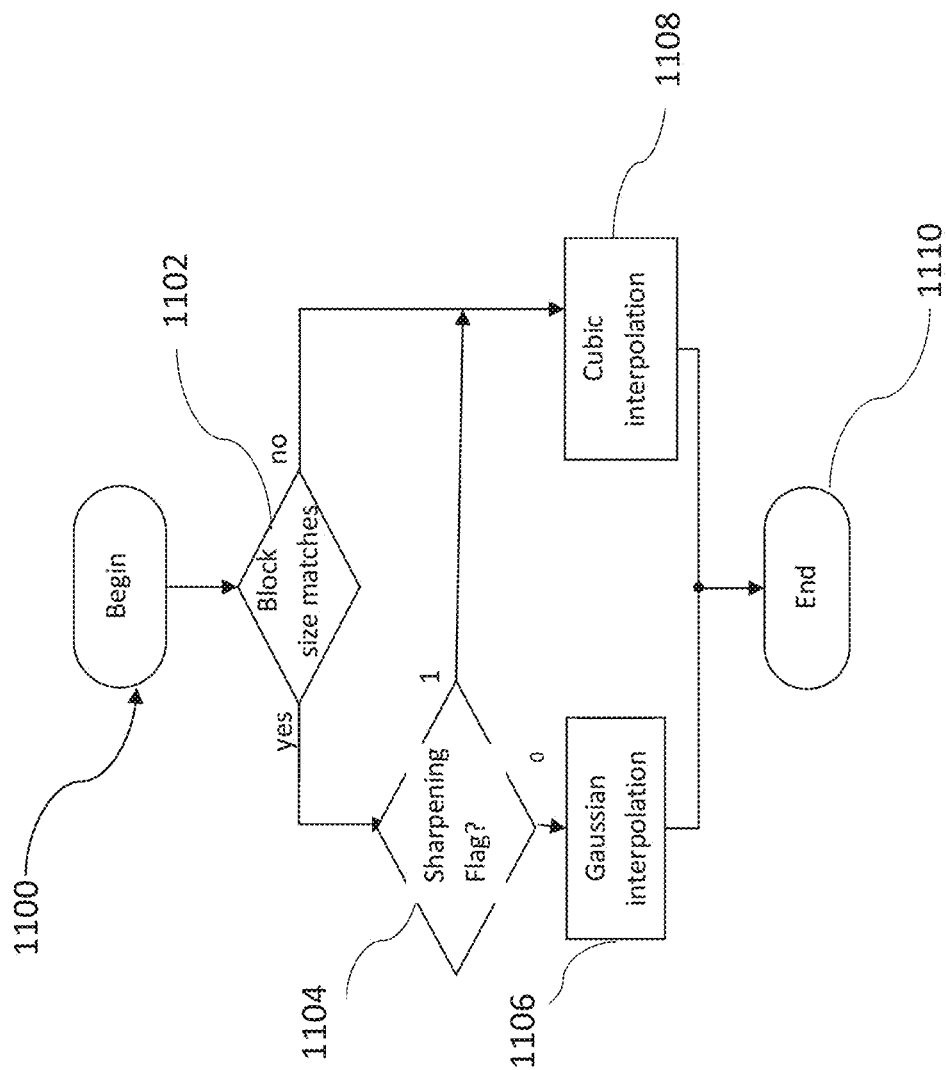
FIG. 11 is a flow chart of a method of interpolation filter selection if sharpening of reference samples is enabled.

FIG. 11 is a flow chart of an exemplary method for determining which filter to use. The method begins in step 1100 and proceeds to determine 1102 whether the block size matches a criterion, e.g. whether the block size corresponds to a predetermined value. If so, the method proceeds to check 1104 whether a sharpening flag, e.g. a sharpening flag parsed from a bitstream, is set. If the sharpening flag is true, the method proceeds with a step 1108 of using a cubic interpolation filter. Otherwise, the method proceeds with step 1106 of using a Gaussian interpolation filter.

Figure 12:
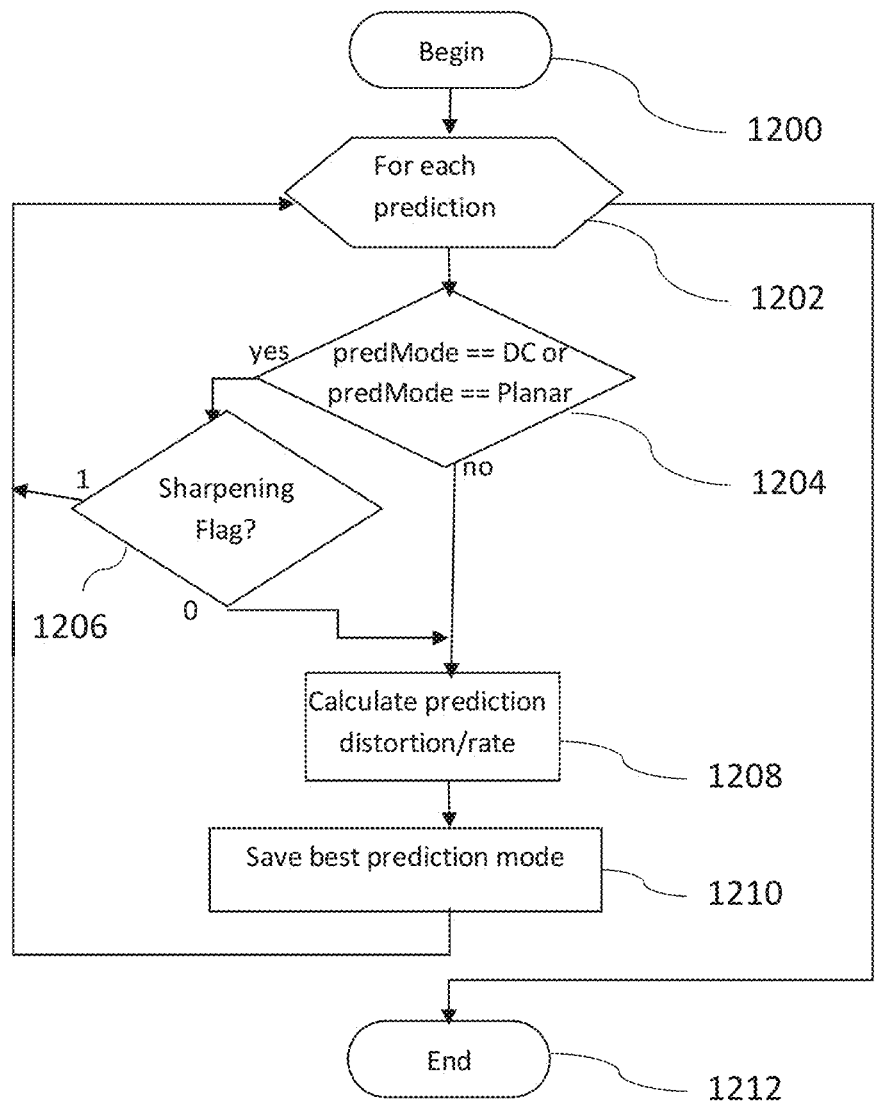
FIG. 12 is a flow chart of a method for prediction mode selection.

In FIG. 12, another exemplary embodiment is presented. Conventionally, during prediction, the block generation intra prediction mechanism looks over existing prediction modes and chooses a best prediction mode based on a minimum of a prediction error or rate/distortion (cost) criterion. The prediction modes can include Planar, DC and Angular modes.

In the method of FIG. 12, which is preferably applied during encoding, if a sharpening mode was selected during a reference samples preparation step, then DC and Planar modes are excluded from the search. Accordingly, the combination of sharpening mode and DC or Planar prediction mode do not have to be signaled to the decoder.

In detail, the method begins in step 1200, and proceeds, for each prediction mode 1202, to determine in step 1204 whether the prediction mode is DC or Planar. If so, the method determines in step 1206 whether a sharpening flag is set. If the sharpening flag is set, the method proceeds with step 1202 to the next prediction mode. If the sharpening flag is not set, the method continues with step 1208 of calculating a prediction distortion/rate. In step 1210, a best prediction mode is saved.

The method of FIG. 12 ends in step 1212 when all prediction modes have been evaluated.

Figure 13:
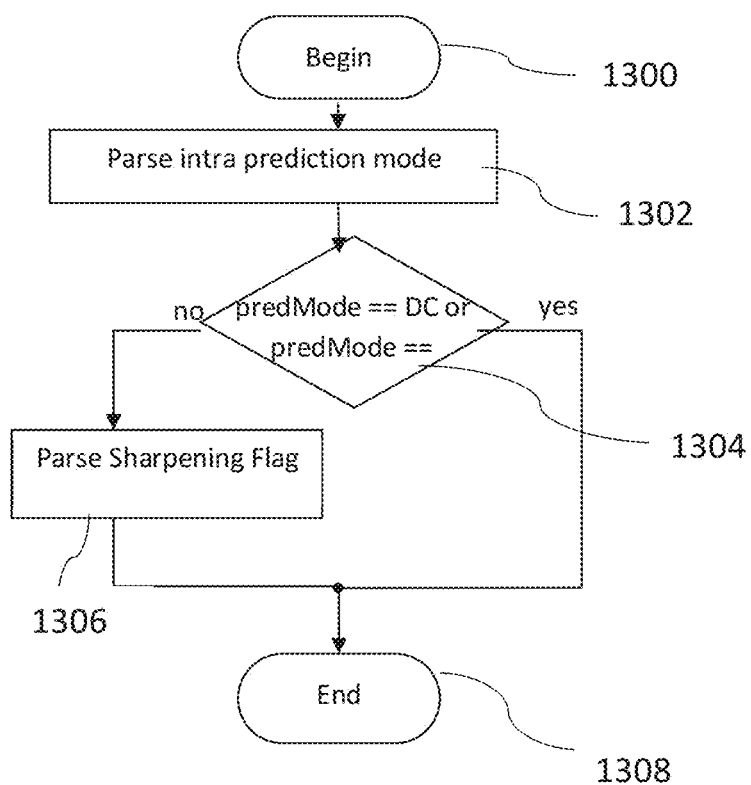
FIG. 13 is a flow chart of a method for conditional parsing of sharpening flags.

FIG. 13 is a flow chart of a corresponding method to be applied during decoding. The method begins in step 1300 and proceeds with step 1302 of parsing an intra prediction mode. Subsequently, in step 1304, the method determines whether a prediction mode is DC or planar. If so, the method ends in step 1308, otherwise in step 1306 the sharpening flag is parsed, e.g. from the bitstream.

On the last step of intra prediction—prediction post-filtering may also be tools contradictive to sharpening of reference samples. E.g. position dependent intra prediction combination (PDPC) according to embodiments of the invention should also be excluded from processing if sharpening of reference samples was chosen. This fact can be used to optimize signaling.

Figure 14:
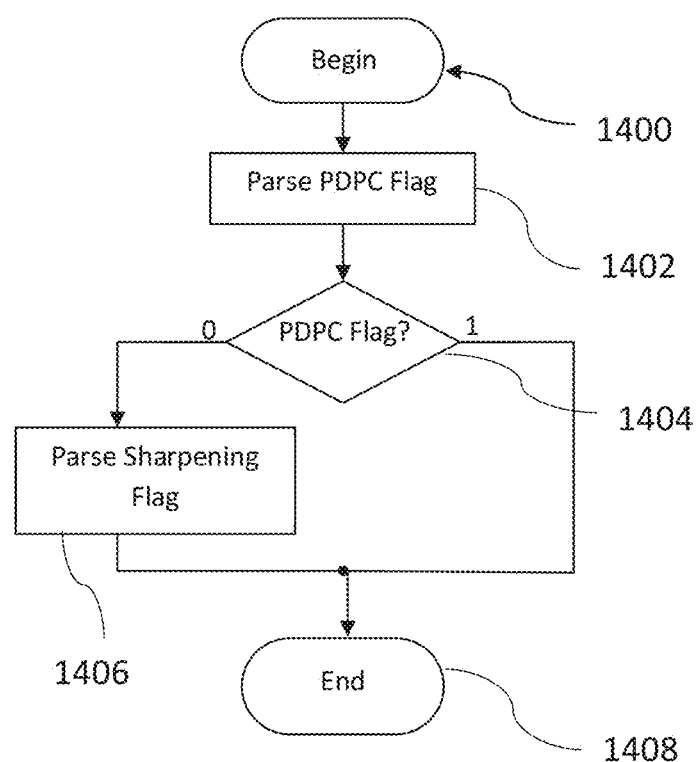
FIG. 14 is a flow chart of another method for conditional parsing of sharpening flags.

Depending on a signaling order, the decoder parses flags like presented in FIG. 14 when the PDPC flag is written first. If the sharpening flag is written first, then the parsing process is performed according to FIG. 15. Another prediction post-filtering tool—multi parameter intra (MPI) prediction also may be harmonized with sharpening tool same way as for PDPC.

In more detail, FIG. 14 is a flow chart of a method to be applied during decoding. After initialization 1400, the method proceeds to parse 1402 the PDPC flag. In step 1404 it is determined whether the PDPC flag is set. If it is set, the method ends in step 1408. Otherwise the method proceeds with step 1406 of parsing the sharpening flag.

Figure 15:
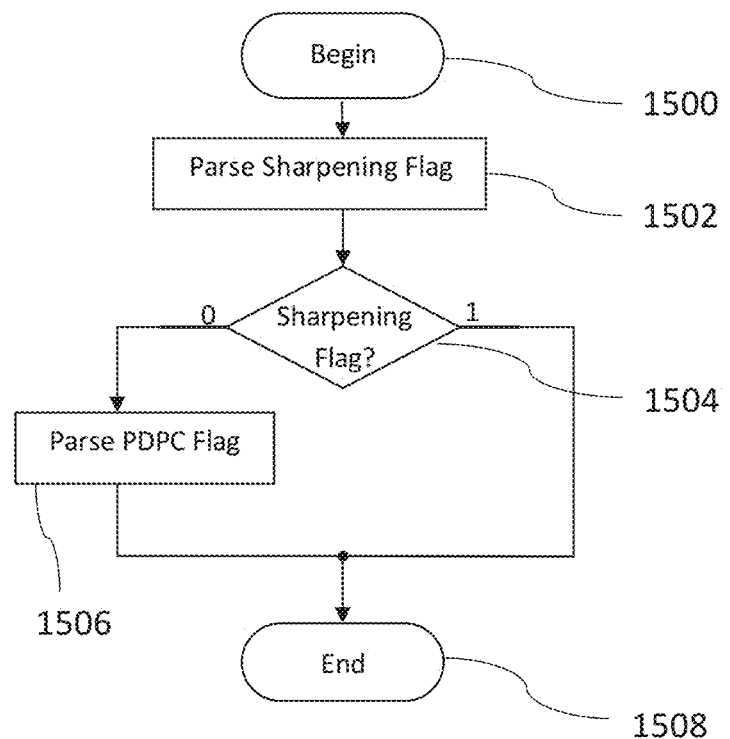
FIG. 15 is a flow chart of a method for conditional parsing of PDPC flags.

FIG. 15 is a flow chart of another method to be applied during decoding. The method begins with a step 1500 and proceeds to parse 1502 a sharpening flag. If it is determined in step 1504 that the sharpening flag is not set, the method in a further step 1506 parses the PDPC flag. The method ends in a final step 1508.

Figure 16:
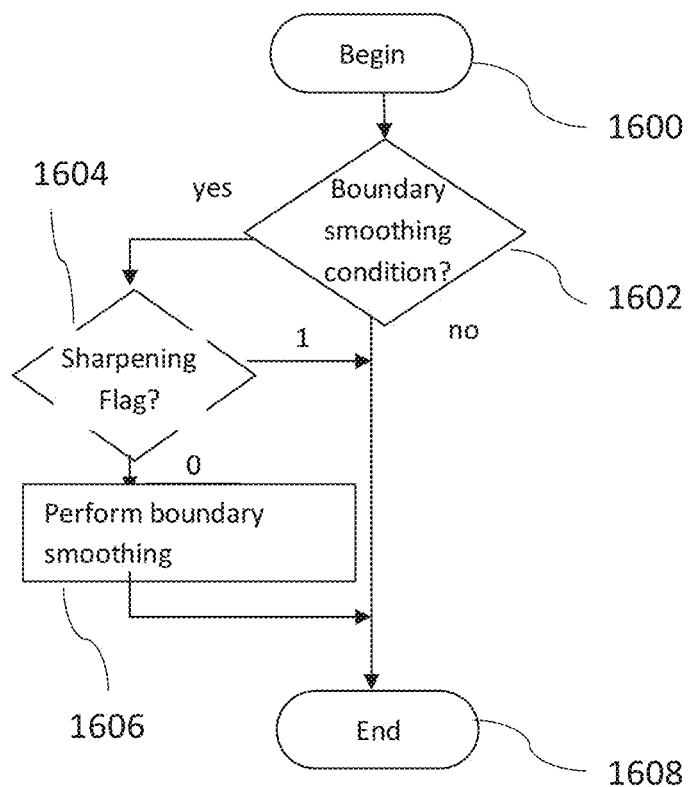
FIG. 16 is a flow chart of a method for boundary smoothing and sharpening harmonization.

FIG. 16 is a flow chart of another exemplary embodiment of joint work of reference samples sharpening and boundary smoothing filter. After initialization 1600, the method determines in step 1602 whether a boundary smoothing condition is enabled. If not, the method ends in a final step 1608. Otherwise the method determines in step 1604 whether a sharpening flag is set. Only if the sharpening flag is not set, the method proceeds with step 1606 to perform boundary smoothing.

The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:

1. A decoder for decoding a block of a current frame of a video from a bitstream, the decoder comprising a processor and a non-transitory processor-readable medium having processor-executable instructions stored thereon, wherein the processor-executable instructions, when executed by the processor, cause the processor to:
    select reference samples of a reconstructed part of the current frame,
    filter the reference samples,
    generate a prediction of the block based on the filtered reference samples and according to an intra prediction mode for the prediction of the block among a plurality of intra prediction modes including an angular prediction mode and a non-angular prediction mode,
    determine first derivatives of the reference samples,
    determine absolute values of the first derivatives,
    determine second derivatives based on the absolute values of the first derivatives, and
    warp the reference samples based on the second derivatives,
    wherein the instructions to filter include instructions to apply a sharpening filter and/or a de-ringing filter to filter the reference samples when the prediction is generated according to the angular prediction mode.

2. The decoder of claim 1, wherein the sharpening filter and/or the de-ringing filter includes a non-linear filter.

3. The decoder of claim 1, wherein the processor-executable instructions, when executed by the processor, cause the processor to activate the sharpening filter and/or the de-ringing filter based on signaling information of the sharpening filter and/or the de-ringing filter in the bitstream and/or based on image properties of one or more reconstructed blocks of the current frame.

4. The decoder of claim 1, wherein the processor-executable instructions, when executed by the processor, further cause the processor to displace each reference sample with a respective displacement vector obtained by scaling the second derivatives with a scaling coefficient, wherein the scaling coefficient is a sharpening strength.

5. The decoder of claim 4, wherein the processor-executable instructions, when executed by the processor, further cause the processor to adapt the scaling coefficient based on signaling in the bitstream and/or based on local image properties.

6. The decoder of claim 1, wherein the processor-executable instructions, when executed by the processor, further cause the processor to limit the absolute value to be above a first threshold and/or below a second threshold.

7. The decoder of claim 1, further comprising a blurring filter configured to smooth the absolute values.

8. An encoder for encoding a block of a current frame of a video in a bitstream, the encoder comprising a processor and a non-transitory processor-readable medium having processor-executable instructions stored thereon, wherein the processor-executable instructions, when executed by the processor, cause the processor to:
    select reference samples of a reconstructed part of the current frame,
    filter the reference samples, using a filter including a sharpening filter and/or a de-ringing filter,
    generate a prediction of the block based on the filtered reference samples and according to a prediction mode for prediction of the block among a plurality of intra prediction modes including an angular prediction mode and a non-angular prediction mode,
    post-filter the prediction of the block to increase prediction efficiency by using an intra-boundary filter to smooth differences on borders between the prediction block and already-coded neighboring blocks and using a Multi-Parameter Intra prediction (MPI) and a Position Dependent intra Prediction Combination (PDPC) to blur different parts of the prediction block with different strength, and
    control whether to apply the sharpening filter and/or the de-ringing filter, wherein the sharpening filter and/or de-ringing filter is applied to the reference samples when the prediction is generated according to the angular prediction mode.

9. The encoder of claim 8, wherein the processor-executable instructions, when executed by the processor, cause the processor to select one of:
    a selective bypass, and
    a selective application of the sharpening and/or de-ringing filter
    by performing a rate-distortion optimization, by minimizing a prediction error criterion and/or based on one or more local image properties.

10. The encoder of claim 8, wherein the filter comprises one or more parameters and wherein the processor-executable instructions, when executed by the processor, cause the processor to select the one or more parameters by performing a rate-distortion optimization, by minimizing a prediction error criterion and/or based on one or more local image properties.

11. The encoder of claim 9, wherein the processor-executable instructions, when executed by the processor, cause the processor to encode a sharpening filter flag, a sharpening coefficient and/or one or more parameters of the sharpening and/or de-ringing filter in the bitstream.

12. A method for decoding a block of a current frame of a video from a bitstream, the method comprising:
- selecting reference samples of a reconstructed part of the current frame,
- filtering the reference samples,
- generating a prediction of the block based on the filtered reference samples and according to a prediction mode including one of an angular prediction mode and a non-angular prediction mode,
- determining first derivatives of the reference samples,
- determining absolute values of the first derivatives,
- determining second derivatives based on the absolute values of the first derivatives, and
- warping the reference samples based on the second derivatives,
- wherein filtering the reference samples includes sharpening and/or de-ringing the reference samples when the prediction is generated according to the angular prediction mode.

13. A method for encoding a block of a current frame of a video in a bitstream, the method comprising:
- selecting reference samples of a reconstructed part of the current frame,
- filtering the reference samples,
- generating a prediction of the block based on the filtered reference samples and according to a prediction mode including one of an angular prediction mode and a non-angular prediction mode, and
- post-filtering the prediction of the block to increase prediction efficiency by using an intra-boundary filter to smooth differences on borders between the prediction block and already-coded neighboring blocks and using a Multi-Parameter Intra prediction (MPI) and a Position Dependent intra Prediction Combination (PDPC) to blur different parts of the prediction block with different strength,
- wherein filtering the reference samples includes sharpening and/or de-ringing the reference samples when the prediction is generated according to the angular prediction mode.

14. A non-transitory computer-readable storage medium storing program code, the program code comprising instructions that when executed by a processor carry out the method of claim 12.

15. A non-transitory computer-readable storage medium storing program code, the program code comprising instructions that when executed by a processor carry out the method of claim 13.

* * * * *